United States Patent [19]

Oikawa

[11] Patent Number: 5,015,078
[45] Date of Patent: May 14, 1991

[54] ASPHERICAL SINGLE LENS
[75] Inventor: Katsuya Oikawa, Mitaka, Japan
[73] Assignee: Canon Kabushiki Kaisha, Tokyo, Japan
[21] Appl. No.: 443,311
[22] Filed: Nov. 30, 1989
[30] Foreign Application Priority Data Dec. 1, 1988 [JP] Japan ................. 63-305543

[51] Int. Cl.⁵ .............................................. G02B 3/02
[52] U.S. Cl. ................................................. 350/432
[58] Field of Search ..................................... 350/432

[56] References Cited

U.S. PATENT DOCUMENTS

| 4,027,952 | 6/1977 | Hugues . | |
|---|---|---|---|
| 4,449,792 | 5/1984 | Arai et al. | 350/432 |
| 4,571,034 | 2/1986 | Nakamura | 350/432 |
| 4,743,093 | 5/1988 | Oinen . | |
| 4,932,763 | 6/1990 | Matsuoka | 350/432 |

FOREIGN PATENT DOCUMENTS

| 57-60697 | 4/1982 | Japan . |
|---|---|---|
| 57-201210 | 12/1982 | Japan . |
| 58-68711 | 4/1983 | Japan . |
| 58-220247 | 12/1983 | Japan . |
| 59-23313 | 2/1984 | Japan . |
| 59-26714 | 2/1984 | Japan . |
| 60-121412 | 6/1985 | Japan . |
| 61-2117 | 1/1986 | Japan . |
| 61-11715 | 1/1986 | Japan . |
| 61-056314 | 3/1986 | Japan . |

Primary Examiner—Paul M. Dzierzynski
Assistant Examiner—Rebecca D. Gass
Attorney, Agent, or Firm—Fitzpatrick, Cella, Harper & Scinto

[57] ABSTRACT

A compact and light-weight aspherical single lens with first and second surfaces that are aspherical surfaces of predetermined shapes. The distance from an arbitrary point on the aspherical surface to the tangential plane of the vertex of the aspherical surface is x; the distance from the arbitrary point to the optic axis in H; the reference radius of curvature of the vth surface is $R_v$, the cone constant of the vth surface is $K_v$ and the aspherical coefficient of the vth surface is $A_{vi}$ (i=3,4 . . . ). The aspherical surface specifically satisfies the conditions (1), (2) and (3), as disclosed hereinafter, to create a simplified lens with high imaging performance.

4 Claims, 5 Drawing Sheets

SPHERICAL ABERRATION

ASTIGMATISM

DISTORTION

ASPHERICAL SINGLE LENS

BACKGROUND OF THE INVENTION

1. Field of the Invention

This invention relates to a single lens having an aspherical surface, and in particular to a single lens having both aspherical surfaces in which NA is of the order of 0.35.

In recent years, optical disks such as video disks and compact disks as optical memories have been widely used as information recording carriers of great memory capacity.

Attention has also been paid to optical cards having advantages such as a great memory capacity and good portability as optical information carriers similar to optical disks.

In order to record information highly densely on a recording carrier of this kind of reproduce recorded information accurately, a high imaging performance is required of an optical system used in an information recording-reproducing apparatus. For example, a resolving power of the order of 1–2 $\mu$m is required for an objective lens and therefore, aberration correction must be effected so that the objective lens may have NA of 0.45 or greater and have an imaging ability to the order of the limit of diffraction.

Also, in recent years, the beam of a semiconductor laser (hereinafter abbreviated as LD) used as a light source for a recording-reproducing device such as an optical disk or an optical card is a divergent light, and adoption is made of a construction in which such beam is made into a parallel beam by a collimator lens and this parallel beam is condensed to 1–2 $\mu$m by an objective lens as described above. At this time, aberration correction must be effected so that the collimator lens may have NA as high as the order which can efficiently utilize the emitted light of LD and may make the light from the light emitting portion of LD of several-tenths of $\mu$m $\times$ several $\mu$m parallel, in other words, may have an imaging ability of the order of the limit of diffraction. If the collimator lens is inferior in its imaging ability, even if the resolving power of the objective lens is sufficient, the performance as the whole optical system is low and preferable recording and reproduction of information cannot be accomplished.

Further, in these information recording-reproducing apparatuses, a head unit including the above-described optical system is moved relative to the information recording carrier to thereby effect the access of information and therefore, it is desirable that each constituent unit be made compact and light in weight to the utmost.

From these viewpoints, the development of an aspherical single lens for use as an objective lens have recently been active, and various techniques are disclosed, for example, Japanese Laid-Open Patent Application No. 57-201210, Japanese Laid-Open Patent Application No. 58-68711, Japanese Laid-Open Patent Application No. 59-23313, Japanese Laid-Open Patent Application No. 59-26714, Japanese Laid-Open Patent Application No. 61-2117, Japanese Laid-Open Patent Application No. 61-11715, Japanese Laid-Open Patent Application No. 61-56314, U.S. Patent Nos. 4,027,952, 4,449,792, 4,571,034, 4,743,093, etc.

However, the aspherical single lenses shown in the aforementioned publications are designed to the objective specification for an optical disk, and are very unsuitable when they are used for an information recording carrier in which the protective layer covering the information recording surface of an optical card or the like is thin as compared with the protective layer of an optical disk, or when they are used as collimator lenses. That is, the thickness t of the transparent protective layer for which the lenses shown in the above-mentioned publications can be suited is of the order of 0.26F–0.28F. In contrast, the thickness t of a protective flat glass plate mounted on the ordinary LD is about 0.25–0.35 mm, and the focal length F of a lens which is appropriate therefor is 0.89–1.35 mm. In this case, however, there are the disadvantages that the radius of curvature becomes too small and the manufacture is very difficult and that the area having a good imaging characteristic which can be regarded as the limit of diffraction (the image height) is very narrow, and this is hardly practical. As what makes up for these disadvantages, there is conceivable a construction in which the thickness of the protective layer is used with a parallel flat plate for correction interposed, but such construction is against the desire for the improved performance by making the optical system compact and light in weight and the reduced cost resulting from a decrease in the number of parts, and is not preferable.

Also, as an aspherical single lens for a collimator, there is shown, for example, in Japanese Laid-Open Patent Application No. 60-121412, an aspherical single lens which is directed chiefly to the use for reproduction and in which NA is 0.2 or less and which is designed for the thickness $t=0.0176F$ of the transparent protective layer, but particularly as a collimator lens recently used for recording or for both recording and reproduction, such an aspherical single lens is not preferable because the effective efficiency of the quantity of emitted light of LD is bad for $NA=0.2$. Further, in the case of an objective lens having NA of 0.45 or greater, the focal length of a collimator lens for which the spacing between the surface of the information recording carrier and the objective lens is secured sufficiently to prevent the contact therebetween and for creating a parallel light having a sufficient cross-section in which no eclipse is caused for the movement of the objective lens in a direction perpendicular to the optic axis thereof, such as auto tracking, is in inverse proportion to NA and therefore, a collimator lens of high NA is preferable also in making the distance (W.D.) between the collimator lens and the LD small.

Further, in recent years, there has been proposed a multibeam optical head provided with a plurality of parallel light sources such as LD arrays and using as a plurality of spots the conjugate images of the plurality of light sources formed on the surface of a recording carrier by an optical system. Such technique is disclosed, for example, in Japanese Laid-Open Patent Application No. 57-60697, Japanese Laid-Open Patent Application No. 58-220247, etc. The uses of the plurality of spots shown in these publications are various, but any of them need be imaged to a diameter of 1 to several $\mu$m. In this construction, a plurality of off-axis beams or an off-axis beam and an on-axis beam are used at a time and therefore, the angle-of-view imaging characteristic of the lens used on the same focal plane becomes more severe than that of the lens heretofore used.

In the conventional lens, the off-axis use has been little devised due basically to the deviation or the like of the axis during mounting because the deterioration of the imaging by the focus movement=curvature of image field+astigmatism caused by the difference in angle of view is absorbed by an auto focusing mechanism or the adjustment during mounting.

SUMMARY OF THE INVENTION

It is an object of the present invention to provide a compact and light-weight aspherical single lens whose both lens surfaces are made into aspherical surfaces of predetermined shapes, whereby the lens shape is simplified and yet the lens has a high imaging performance.

Particularly, it is an object of the present invention to provide an aspherical single lens in which NA is of the order of 0.35 and aberration correction has been effected well within a range of the angle of view of 1.2° with a parallel flat plate having a thickness t of about 0.02F–0.13F being interposed.

Further, it is an object of the present invention to provide an aspherical single lens in which the movement of the focus by the difference in angle of view is small within said range of the angle of view.

The aspherical single lens according to the present invention is an aspherical single lens whose first and second surfaces each are formed by an aspherical surface and in which said aspherical surface is an aspherical surface represented by the following equation when the distance from an arbitrary point on said aspherical surface to the tangential plane of the vertex of the aspherical surface is x and the distance from said arbitrary point to the optic axis is H and the reference radius of curvature of the $\nu$th surface (the radius of curvature of the vertex) is $R_\nu$ and the cone constant of the $\nu$th surface is $K_\nu$ and the aspherical coefficient of the $\nu$th surface is $A_{\nu i}$ (i=3, 4, . . . ) and which satisfies the following conditions (1), (2) and (3):

$$X = \frac{H^2/R_\nu}{1 + \sqrt{1 - (1 + K_\nu)(H/R_\nu)^2}} + A_{\nu 3}H^3$$

$$\ldots + A_{\nu 4}H^4 + \ldots$$

$$(\nu = 1, 2)$$

$$0.73 < \frac{(N - 1)F^3}{N^2 R_1^3} < 0.85 \tag{1}$$

$$0.31 < \frac{(N - 1)D}{NR_1} < 0.47 \tag{2}$$

$$-0.36 < \frac{R_1}{R_2} < -0.18 \tag{3}$$

where F is the focal length of the aspherical single lens, D is the on-axis thickness of the aspherical single lens, and N is the refractive index of the aspherical single lens for the wavelength used.

DESCRIPTION OF THE PREFERRED EMBODIMENTS

Figure 1:
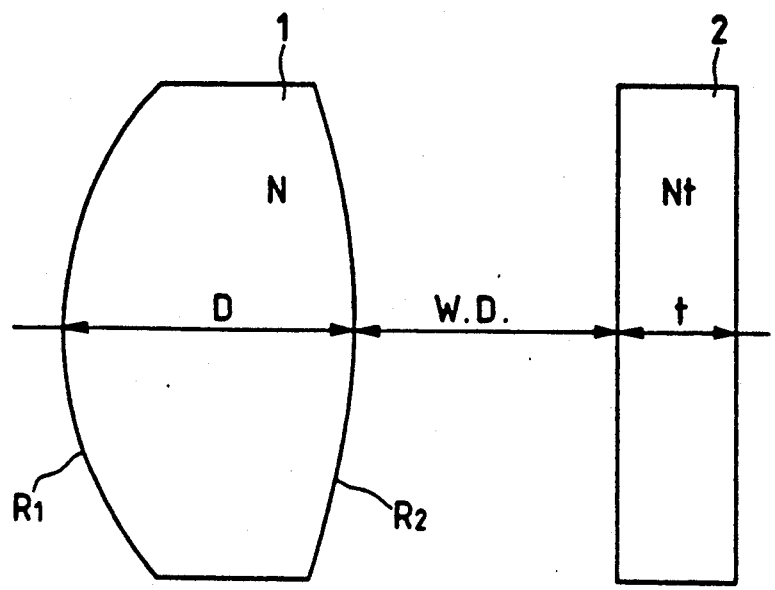
FIG. 1 shows the lens cross-section of the aspherical single lens according to the present invention.
Figure 2:
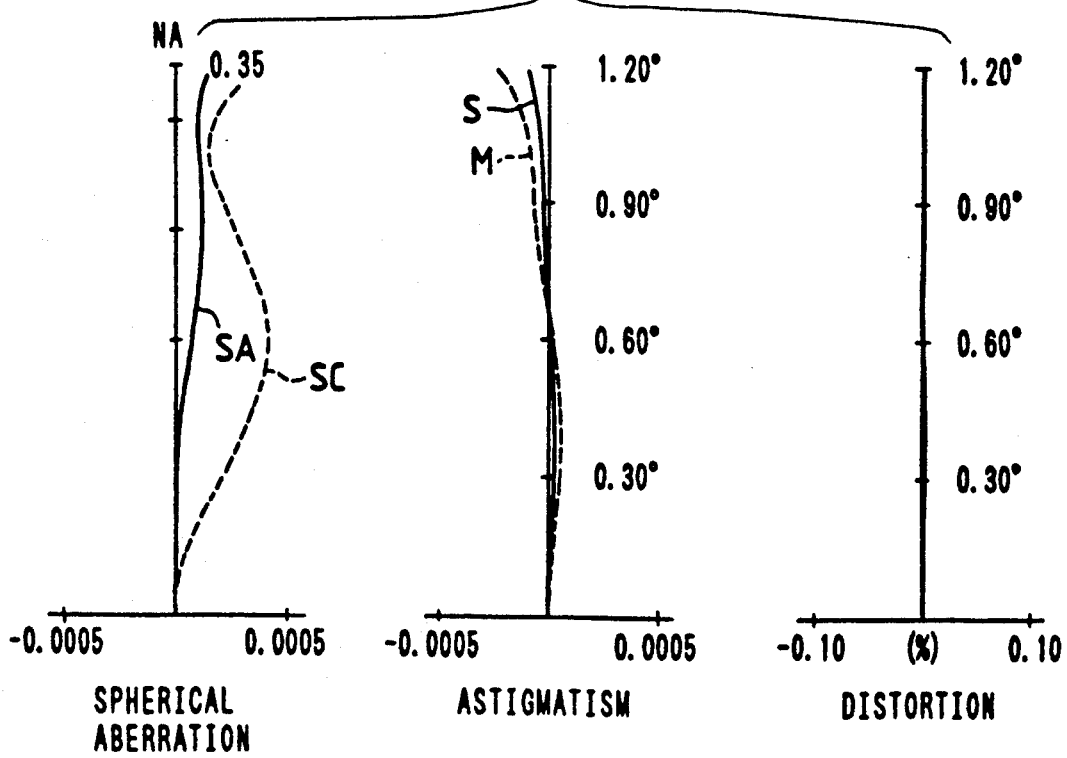
FIGS. 2, 3, 4, 5, 6, 7, 8 and 9 show by a bracket, sets of three graphs for spherical aberration, astigmatism and distortion in the respective embodiments of the aspherical single lens according to the present invention.
Figure 3:
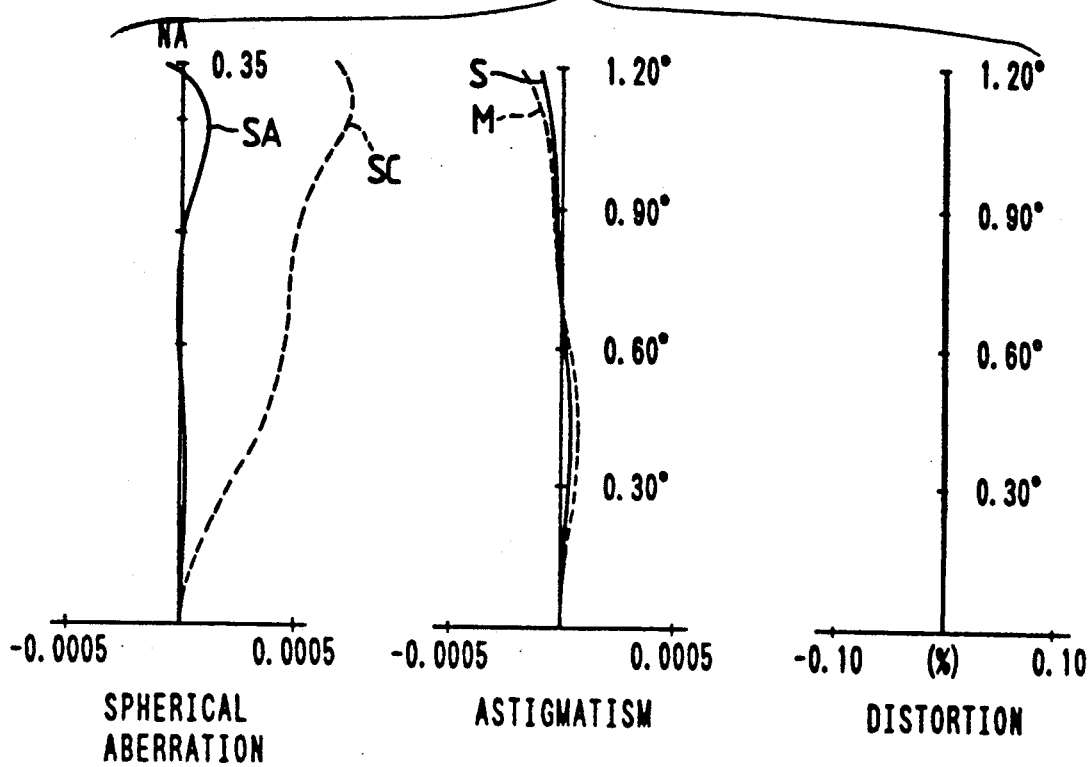
Figure 4:
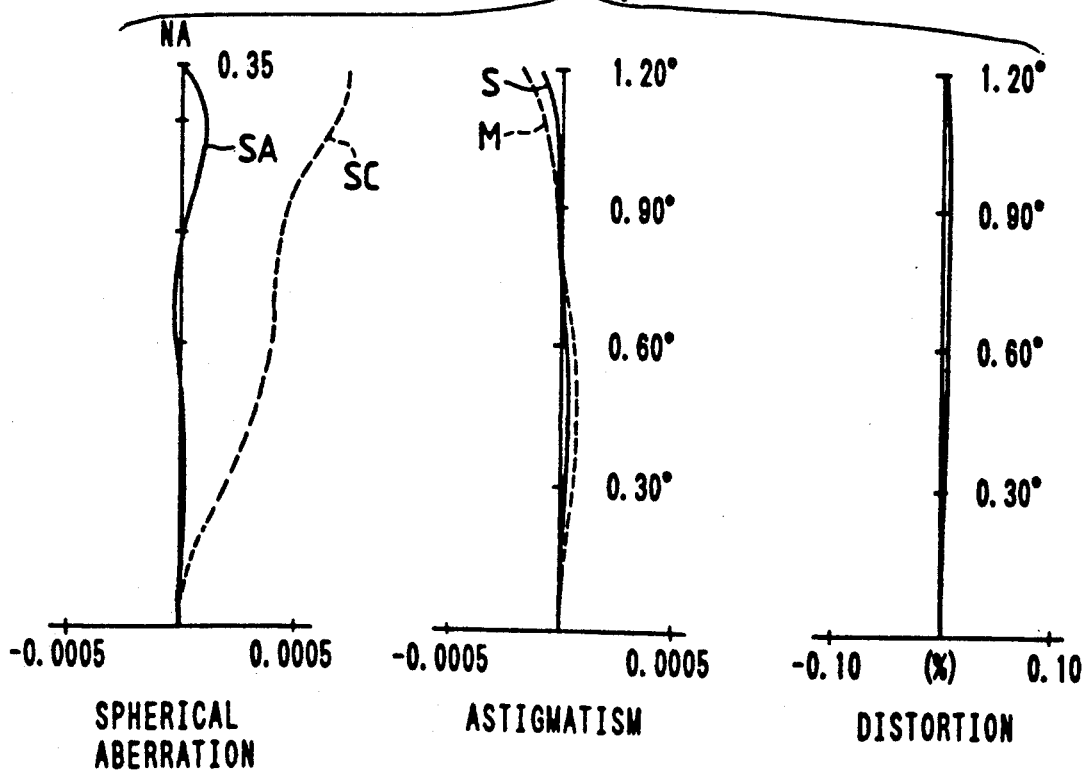
Figure 5:
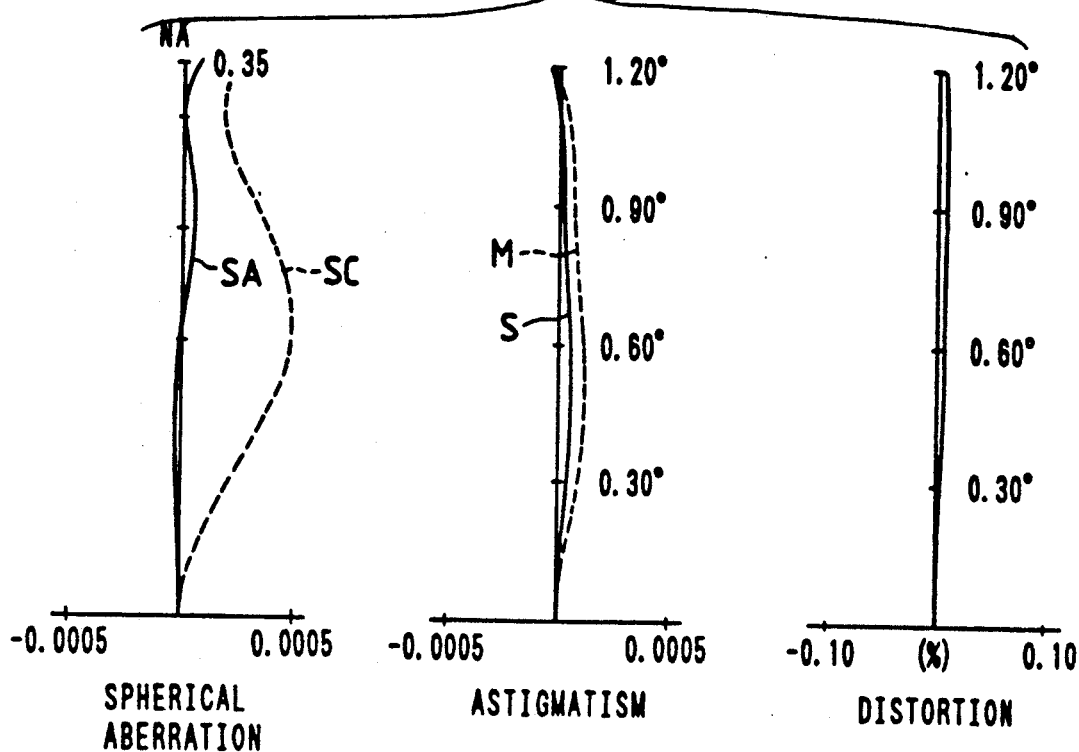
Figure 6:
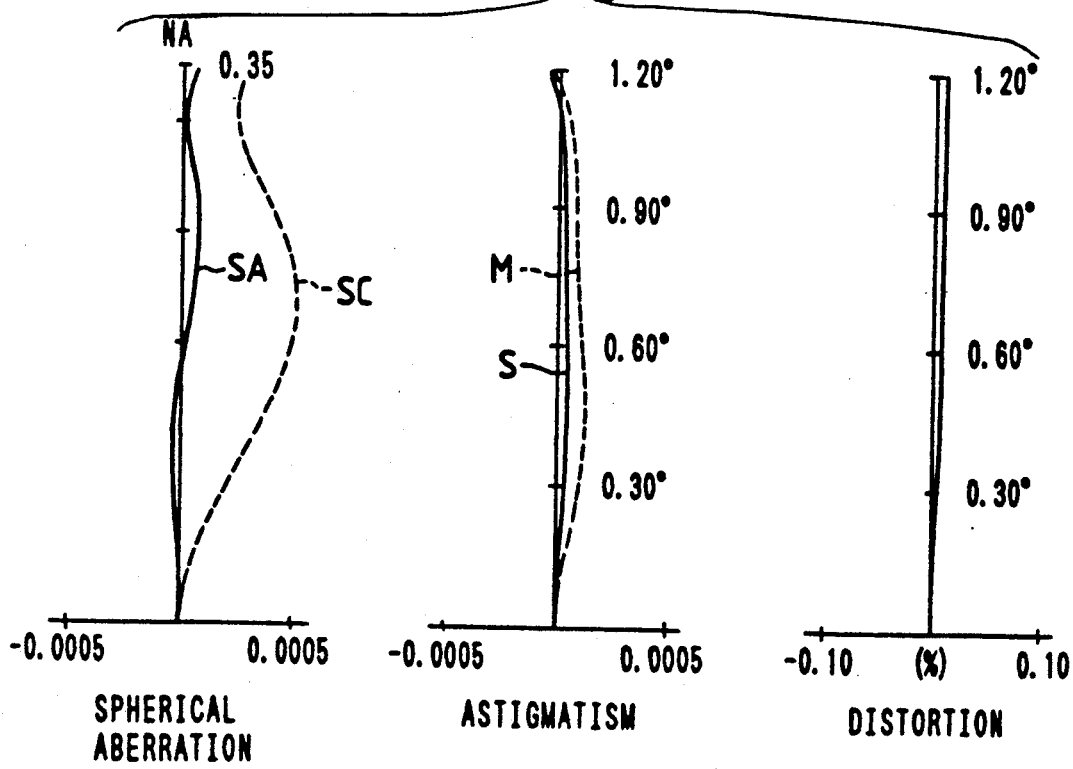
Figure 7:
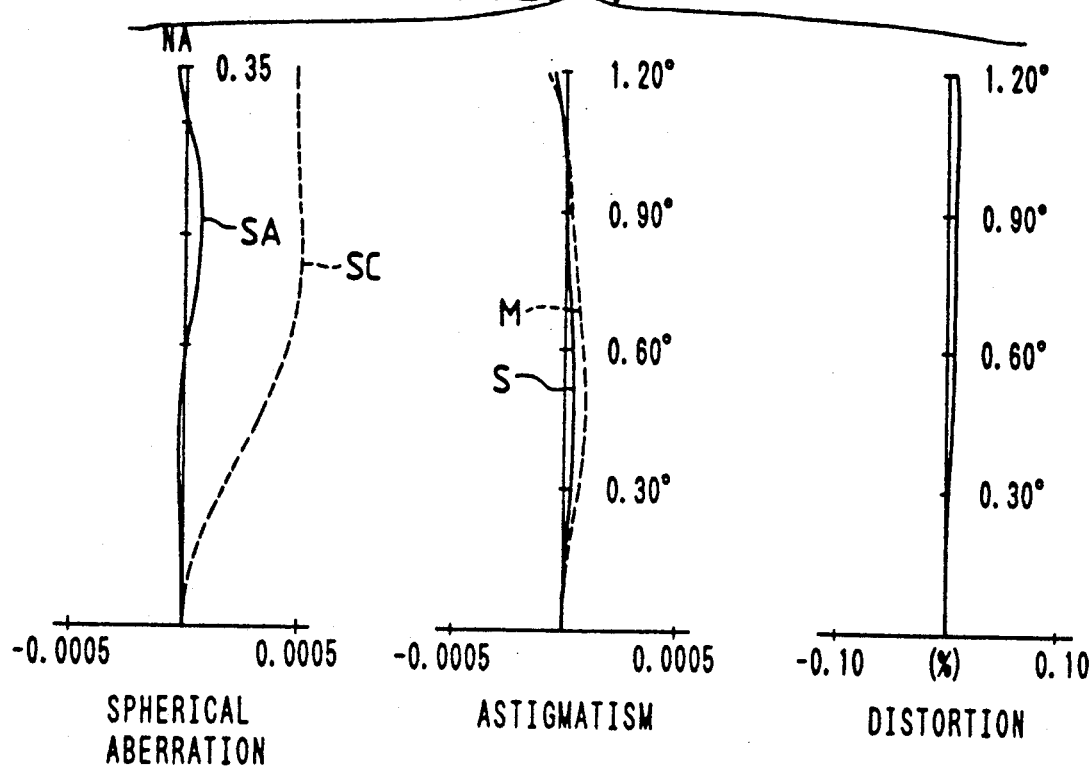
Figure 8:
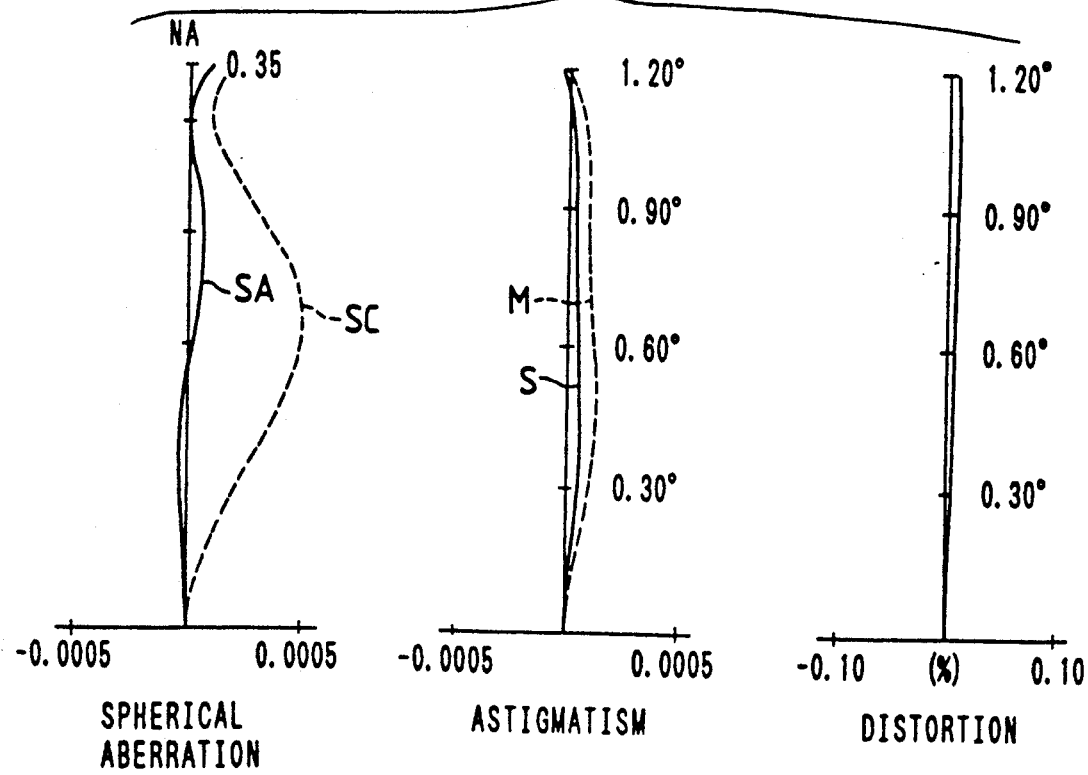
Figure 9:
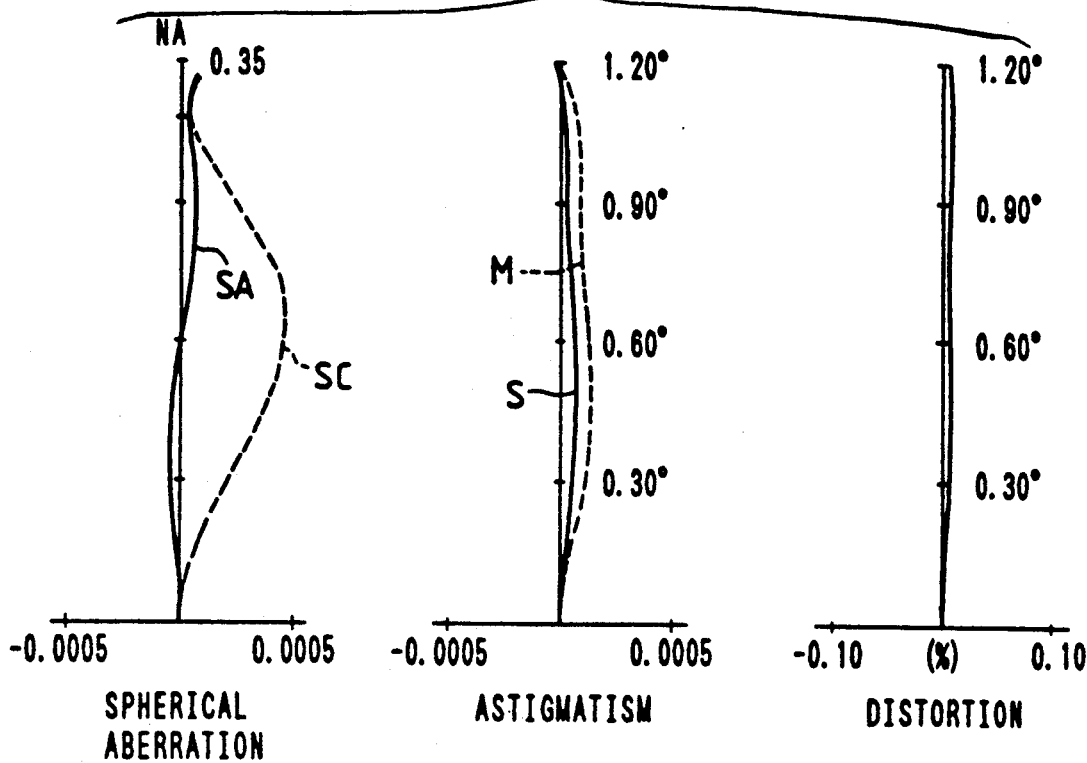

The aspherical single lens according to the present invention is an aspherical single lens whose first and second surfaces each are formed by an aspherical surface and in which said aspherical surface is an aspherical surface represented by the following equation when the distance from an arbitrary point on said aspherical surface to the tangential plane of the vertex of said aspherical surface is x and the distance from said arbitrary point to the optic axis is H and the reference radius of curvature of the $\nu$th surface (the radius of curvature of the vertex) is $R_\nu$ and the cone constant of the $\nu$th surface is $K_\nu$ and the aspherical coefficient of the $\nu$th surface is $A_{\nu i}$ (i=3, 4, . . . ) and which satisfies the following conditions (1), (2) and (3):

$$X = \frac{H^2/R_\nu}{1 + \sqrt{1 - (1 + K_\nu)(H/R_\nu)^2}} + A_{\nu 3}H^3$$

$$\ldots + A_{\nu 4}H^4 + \ldots$$

$$(\nu = 1, 2)$$

$$0.73 < \frac{(N - 1)F^3}{N^2 R_1^3} < 0.85 \tag{1}$$

$$0.31 < \frac{(N - 1)D}{NR_1} < 0.47 \tag{2}$$

$$-0.36 < \frac{R_1}{R_2} < -0.18 \tag{3}$$

where F is the focal length of the aspherical single lens, D is the on-axis thickness of the aspherical single lens, and N is the refractive index of the aspherical single lens for the wavelength used.

The conditions (1) to (3) will now be described.

The conditions (1) and (2) of the present invention are for correcting spherical aberration and coma well in a tertiary area.

According to Yoshiya Matsui: *Lens Designing Method* (Kyoritsu Publishing Co., Ltd.), the tertiary spherical aberration coefficients $I_1$ and $I_2$ of the first surface and the second surface, respectively, and the coma coefficients $II_1$ and $II_2$ of the first surface and the second surface, respectively, are represented as follows when the entrance pupil is made coincident with the first surface and the object distance is infinity:

$$I_1 = \left(\frac{1}{R_1}\right)^2 \left(\frac{N-1}{N^2 R_1}\right) + \phi_1$$

$$I_2 = \left(1 - \frac{D}{N} \frac{N-1}{R_1}\right)\left[\left(1 - \frac{D}{N} \frac{N-1}{R_1}\right)\frac{N}{R_2} - \right.$$

$$\left. \frac{N-1}{R_1}\right]^2 \left(1 - \frac{N-1}{N^2 R_1}\right) + \left(1 - \frac{D}{N} \frac{N-1}{R_1}\right)\phi_2$$

$$II_1 = \frac{N-1}{N^2 R_1^2}$$

-continued $$II_2 = \left(1 - \frac{D}{N}\frac{N-1}{R_1}\right)\left[\left(1 - \frac{D}{N}\frac{N-1}{R_1}\right)\frac{N}{R_2} - \right.$$

$$\left.\frac{N-1}{R_1}\right]\left(\frac{D}{R_2} + 1\right)\left(1 - \frac{N-1}{N^2 R_1}\right) +$$

$$\left(1 - \frac{D}{N}\frac{N-1}{R_1}\right)^3 \frac{D}{N}\phi_2$$

where $\phi_1$ and $\phi_2$ are the tertiary aspherical terms of the first surface and the second surface, respectively, $R_1$ is the paraxial radius of curvature of the first surface, and $R_2$ is the paraxial radius of curvature of the second surface.

The tertiary spherical aberration coefficient I and coma coefficient II of the entire lens are found from the sums of the aberration coefficients of the respective surfaces, $$I = I_1 + I_2$$

$$II = II_1 + II_2$$

and the lens shape and each aspherical amount are determined so that I and II may be appropriate values.

As is apparent from the above-mentioned equations, when the shape (the focal length, the working distance, etc.) of the lens is determined, the values of $R_1$, $R_2$, D and N are substantially determined, and the degree of freedom left to make the aberration coefficients I and II into appropriate values is only $\phi_1$ and $\phi_2$. Accordingly, it is necessary that the shape of the lens be determined with aberration correction taken into consideration to a certain degree, and the numerical value ranges therefor are the conditions (1) and (2).

If the numerical value range of the condition (1) is departed from, particularly the spherical aberration of the first surface will become great and the aberration cannot be corrected by the aspherical term $\phi_1$ of the first surface.

The condition (2) is a condition for correcting coma well-balancedly in the second surface, and if the numerical value range of this condition is departed from, the aberration cannot be corrected by the aspherical term $\phi_2$ of the second surface and the off-axis imaging performance will be remarkably deteriorated.

The condition (3) is a condition for satisfying chiefly the sine condition. In the present invention, together with the on-axis aberration, the off-axis aberration within a predetermined range, particularly coma, is corrected well, but if the range of the condition (3) is departed from, the isoplanatic condition will be remarkably lost and this is not preferable. If the upper limit of this condition is exceeded, the radius of curvature of the first surface will become too small and negative spherical aberration will occur greatly and aberration correction will become difficult, and there is also the disadvantage that the working distance W.D. will become short and a difficulty in practical use will occur.

Some embodiments of the aspherical single lens of the present invention will be shown below.

However, as shown in FIG. 1, F is the focal length of the lens, NA is the numerical aperture of the lens, $\beta$ is the paraxial lateral magnification, $R_1$ is the paraxial radius of curvature of the aspherical surface which is the first surface, $R_2$ is the paraxial radius of curvature of the aspherical surface which is the second surface, D is the center thickness of the lens, W.D. is the working distance, t is the thickness of a parallel flat plate, N is the refractive index of the lens for the wavelength used $\lambda = 830$ nm, Nt is the refractive index of the parallel flat plate for the wavelength used $\lambda = 830$ nm, and $\Delta\nu(j)$ ($\nu = 1, 2$) is the difference in the direction of the optic axis between the aspherical surface at j ratio in the effective lens diameter determined in the $\nu$th surface by NA (numerical aperture) and the aspherical surface having a paraxial radius of curvature $R_\nu$ (as regards $\Delta\nu(j)$, the direction in which the curvature of the aspherical surface becomes weaker is positive).

The shape of the aspherical surface is an aspherical surface represented by the following equation when the distance from an arbitrary point on said aspherical surface to the tangential plane of the vertex of said aspherical surface is x and the distance from said arbitrary point to the optic axis is H and the reference radius of curvature of the $\nu$th surface (the radius of curvature of the vertex) is $R_\nu$ and the cone constant of the $\nu$th surface is $K_\nu$ and the aspherical coefficient of the $\nu$th surface is $A_{\nu i}$ (i = 3, 4, . . . ).

$$X = \frac{H^2/R_\nu}{1 + \sqrt{1 - (1 + K_\nu)(H/R_\nu)^2}} + A_{\nu 3}H^3 \ldots +$$

$$A_{\nu 4}H^4 + \ldots$$

$(\nu = 1, 2)$

FIGS. 2 to 9 show aberrations in the lenses of Embodiments 1 to 8 of the present invention. In these figures, spherical aberration, astigmatism and distortion are shown, and SA represents spherical aberration, SC represents the amount of dissatisfaction of the sine condition, M represents the curvature of image field of the meridional plane, and S represents the curvature of image field of the sagittal plane.

| Embodiment 1 | | | |
|---|---|---|---|
| F | NA | $\beta$ | D |
| 1 | 0.35 | 0 | 0.57151 |
| N | W.D. | t | Nt |
| 1.57532 | 0.65404 | 0.04285 | 1.50974 |
| 1st Surface | | 2nd Surface | |
| $R_\nu$ | $6.57226 \times 10^{-1}$ | $-3.15037$ | |
| $K_\nu$ | 0 | $-10$ | |
| $A_{\nu 2}$ | 0 | 0 | |
| $A_{\nu 3}$ | $7.11755 \times 10^{-3}$ | $2.89032 \times 10^{-2}$ | |
| $A_{\nu 4}$ | $-2.86398 \times 10^{-1}$ | $-2.34713 \times 10^{-1}$ | |
| $A_{\nu 5}$ | $-1.51098 \times 10^{-1}$ | $3.24935$ | |
| $A_{\nu 6}$ | $8.4745 \times 10^{-1}$ | $-1.22776 \times 10^{1}$ | |
| $A_{\nu 7}$ | $-5.58895$ | $4.96741$ | |
| $A_{\nu 8}$ | $7.68787$ | $-2.93827 \times 10^{1}$ | |
| $A_{\nu 9}$ | $1.85468$ | $4.01619 \times 10^{2}$ | |
| $A_{\nu 10}$ | $-1.64312 \times 10^{1}$ | $-5.3856 \times 10^{2}$ | |
| $A_{\nu 11}$ | $4.13974$ | $-6.01732 \times 10^{2}$ | |
| $\frac{N-1}{N^2}\frac{1}{R_1^3}$ | | 0.81662 | |
| $\frac{N-1}{N}\frac{D}{R_1}$ | | 0.31758 | |
| $\frac{R_1}{R_2}$ | | $-0.20864$ | |

-continued

Embodiment 1

| | | |
|---|---|---|
| $\frac{1}{NA}\frac{D}{F}$ | | 1.63289 |
| $\frac{D}{R_2}$ | | −0.18141 |
| $\Delta_{1(10)}$ | | 0.00515 |
| $\Delta_{1(9)}$ | | 0.00319 |
| $\Delta_{1(7)}$ | | 0.00105 |
| $\Delta_{1(5)}$ | | 0.00025 |
| $\Delta_{2(10)}$ | | 0.00097 |
| $\Delta_{2(9)}$ | | 0.00064 |
| $\Delta_{2(7)}$ | | 0.00027 |
| $\Delta_{2(5)}$ | | 0.00009 |

Embodiment 2

| F | NA | β | D |
|---|---|---|---|
| 1 | 0.35 | 0 | 0.64286 |
| N | W.D. | t | Nt |
| 1.57532 | 0.62381 | 0.04286 | 1.50974 |

| | 1st Surface | 2nd Surface |
|---|---|---|
| $R_\nu$ | 0.67503 | −2.54029 |
| $K_\nu$ | 0 | −10 |
| $A_{\nu 2}$ | 0 | 0 |
| $A_{\nu 3}$ | $5.10080 \times 10^{-4}$ | $2.81938 \times 10^{-2}$ |
| $A_{\nu 4}$ | $-2.36856 \times 10^{-1}$ | $-2.47055 \times 10^{-1}$ |
| $A_{\nu 5}$ | $-2.51000 \times 10^{-1}$ | 3.15512 |
| $A_{\nu 6}$ | 3.460312 | $-1.10968 \times 10^{1}$ |
| $A_{\nu 7}$ | −5.97420 | 2.08073 |
| $A_{\nu 8}$ | 8.34266 | $-3.04516 \times 10^{1}$ |
| $A_{\nu 9}$ | $-6.25420 \times 10^{-1}$ | $4.13911 \times 10^{2}$ |
| $A_{\nu 10}$ | $-1.16764 \times 10^{-1}$ | $-5.83189 \times 10^{2}$ |
| $A_{\nu 11}$ | 4.13668 | $-6.01286 \times 10^{2}$ |

| | | |
|---|---|---|
| $\frac{N-1}{N^2}\frac{1}{R_1^3}$ | | 0.75371 |
| $\frac{N-1}{N}\frac{D}{R_1}$ | | 0.34780 |
| $\frac{R_1}{R_2}$ | | −0.26573 |
| $\frac{1}{NA}\frac{D}{F}$ | | 1.83674 |
| $\frac{D}{R_2}$ | | −0.27140 |
| $\Delta_{1(10)}$ | | 0.00544 |
| $\Delta_{1(9)}$ | | 0.00336 |
| $\Delta_{1(7)}$ | | 0.00111 |
| $\Delta_{1(5)}$ | | 0.00027 |
| $\Delta_{2(10)}$ | | 0.00092 |
| $\Delta_{2(9)}$ | | 0.00059 |
| $\Delta_{2(7)}$ | | 0.00024 |
| $\Delta_{2(5)}$ | | 0.00008 |

Embodiment 3

| F | NA | β | D |
|---|---|---|---|
| 1 | 0.35 | 0 | 0.67143 |
| N | W.D. | t | Nt |
| 1.57532 | 0.60852 | 0.04286 | 1.50974 |

| | 1st Surface | 2nd Surface |
|---|---|---|
| $R_\nu$ | $6.75349 \times 10^{-1}$ | −2.47394 |
| $K_\nu$ | 0 | −10 |
| $A_{\nu 2}$ | 0 | 0 |
| $A_{\nu 3}$ | $-3.11914 \times 10^{-5}$ | $2.91244 \times 10^{-2}$ |
| $A_{\nu 4}$ | $-2.28221 \times 10^{-1}$ | $-2.27017 \times 10^{-1}$ |
| $A_{\nu 5}$ | $-2.53933 \times 10^{-1}$ | 3.15426 |
| $A_{\nu 6}$ | 1.06228 | $-1.10901 \times 10^{1}$ |
| $A_{\nu 7}$ | −5.77163 | 2.74887 |
| $A_{\nu 8}$ | 8.48398 | $-3.04324 \times 10^{1}$ |
| $A_{\nu 9}$ | −1.35592 | $4.06201 \times 10^{2}$ |
| $A_{\nu 10}$ | $-1.13837 \times 10^{1}$ | $-5.80491 \times 10^{2}$ |
| $A_{\nu 11}$ | 4.13547 | $-6.01111 \times 10^{2}$ |

| | | |
|---|---|---|
| $\frac{N-1}{N^2}\frac{1}{R_1^3}$ | | 0.75264 |
| $\frac{N-1}{N}\frac{D}{R_1}$ | | 0.36309 |
| $\frac{R_1}{R_2}$ | | −0.34924 |
| $\frac{1}{NA}\frac{D}{F}$ | | 1.91837 |
| $\frac{D}{R_2}$ | | −0.25307 |
| $\Delta_{1(10)}$ | | 0.00523 |
| $\Delta_{1(9)}$ | | 0.00329 |
| $\Delta_{1(7)}$ | | 0.00109 |
| $\Delta_{1(5)}$ | | 0.00026 |
| $\Delta_{2(10)}$ | | 0.00097 |
| $\Delta_{2(9)}$ | | 0.00063 |
| $\Delta_{2(7)}$ | | 0.00026 |
| $\Delta_{2(5)}$ | | 0.00008 |

Embodiment 4

| F | NA | β | D |
|---|---|---|---|
| 1 | 0.35 | 0 | 0.71425 |
| N | W.D. | t | Nt |
| 1.57532 | 0.58927 | 0.04286 | 1.50974 |

| | 1st Surface | 2nd Surface |
|---|---|---|
| $R_\nu$ | $6.82246 \times 10^{-1}$ | −2.26733 |
| $K_\nu$ | 0 | −15 |
| $A_{\nu 2}$ | 0 | 0 |
| $A_{\nu 3}$ | $9.53796 \times 10^{-3}$ | $3.84291 \times 10^{-2}$ |
| $A_{\nu 4}$ | $-2.94599 \times 10^{-1}$ | $-3.01522 \times 10^{-1}$ |
| $A_{\nu 5}$ | $-6.59083 \times 10^{-2}$ | 2.91608 |
| $A_{\nu 6}$ | $8.41568 \times 10^{-1}$ | $-1.03985 \times 10^{1}$ |
| $A_{\nu 7}$ | −5.46078 | $2.20230 \times 10^{1}$ |
| $A_{\nu 8}$ | 8.43319 | $1.16639 \times 10^{2}$ |
| $A_{\nu 9}$ | −2.12929 | $1.16639 \times 10^{2}$ |
| $A_{\nu 10}$ | $-1.13301 \times 10^{1}$ | $-1.23485 \times 10^{2}$ |
| $A_{\nu 11}$ | 4.13576 | $-6.01524 \times 10^{2}$ |

| | | |
|---|---|---|
| $\frac{N-1}{N^2}\frac{1}{R_1^3}$ | | 0.73003 |
| $\frac{N-1}{N}\frac{D}{R_1}$ | | 0.38234 |
| $\frac{R_1}{R_2}$ | | −0.30096 |
| $\frac{1}{NA}\frac{D}{F}$ | | 2.04071 |
| $\frac{D}{R_2}$ | | −0.30096 |
| $\Delta_{1(10)}$ | | 0.00516 |
| $\Delta_{1(9)}$ | | 0.00319 |
| $\Delta_{1(7)}$ | | 0.00104 |
| $\Delta_{1(5)}$ | | 0.00025 |
| $\Delta_{2(10)}$ | | 0.00094 |
| $\Delta_{2(9)}$ | | 0.00063 |
| $\Delta_{2(7)}$ | | 0.00027 |

-continued

Embodiment 4

| | |
|---|---|
| $\Delta_{2(5)}$ | 0.00009 |

Embodiment 5

| F | NA | $\beta$ | D |
|---|---|---|---|
| 1 | 0.35 | 0 | 0.74286 |
| N | W.D. | t | Nt |
| 1.57532 | 0.57302 | 0.04286 | 1.50974 |

| | 1st Surface | 2nd Surface |
|---|---|---|
| $R_\nu$ | $6.80653 \times 10^{-1}$ | $-2.23585$ |
| $K_\nu$ | 0 | $-15$ |
| $A_{\nu 2}$ | 0 | 0 |
| $A_{\nu 3}$ | $9.73024 \times 10^{-3}$ | $3.84969 \times 10^{-2}$ |
| $A_{\nu 4}$ | $-2.91351 \times 10^{-1}$ | $-2.60168 \times 10^{-1}$ |
| $A_{\nu 5}$ | $-6.29091 \times 10^{-2}$ | 2.97888 |
| $A_{\nu 6}$ | $8.82125 \times 10^{-1}$ | $-1.046993 \times 10^{1}$ |
| $A_{\nu 7}$ | $-5.4284$ | $3.23153 \times 10^{-1}$ |
| $A_{\nu 8}$ | 8.42331 | $2.18406 \times 10^{1}$ |
| $A_{\nu 9}$ | $-2.39636$ | $1.18423 \times 10^{2}$ |
| $A_{\nu 10}$ | $-1.11361 \times 10^{1}$ | $-1.26987 \times 10^{2}$ |
| $A_{\nu 11}$ | 4.13641 | $-6.01201 \times 10^{2}$ |

| | |
|---|---|
| $\frac{N-1}{N^2}\frac{1}{R_1^3}$ | 0.73152 |
| $\frac{N-1}{N}\frac{D}{R_1}$ | 0.39858 |
| $\frac{R_1}{R_2}$ | $-0.30443$ |
| $\frac{1}{NA}\frac{D}{F}$ | 2.12245 |
| $\frac{D}{R_2}$ | $-0.33225$ |
| $\Delta_{1(10)}$ | 0.00500 |
| $\Delta_{1(9)}$ | 0.00309 |
| $\Delta_{1(7)}$ | 0.00102 |
| $\Delta_{1(5)}$ | 0.00024 |
| $\Delta_{2(10)}$ | 0.00102 |
| $\Delta_{2(9)}$ | 0.00069 |
| $\Delta_{2(7)}$ | 0.00029 |
| $\Delta_{2(5)}$ | 0.00009 |

Embodiment 6

| F | NA | $\beta$ | D |
|---|---|---|---|
| 1 | 0.35 | 0 | 0.71514 |
| N | W.D. | t | Nt |
| 1.57532 | 0.60295 | 0.02143 | 1.50974 |

| | 1st Surface | 2nd Surface |
|---|---|---|
| $R_\nu$ | $6.82175 \times 10^{-1}$ | $-2.26672$ |
| $K_\nu$ | 0 | $-1.41929 \times 10^{1}$ |
| $A_{\nu 2}$ | 0 | 0 |
| $A_{\nu 3}$ | $8.36446 \times 10^{-3}$ | $3.48641 \times 10^{-2}$ |
| $A_{\nu 4}$ | $-2.95418 \times 10^{-1}$ | $-2.98386 \times 10^{-1}$ |
| $A_{\nu 5}$ | $-6.12657 \times 10^{-2}$ | 3.01874 |
| $A_{\nu 6}$ | $8.3697 \times 10^{-1}$ | $-1.04499 \times 10^{1}$ |
| $A_{\nu 7}$ | $-5.46406$ | $4.02651 \times 10^{-1}$ |
| $A_{\nu 8}$ | 8.43295 | $2.1995 \times 10^{1}$ |
| $A_{\nu 9}$ | $-2.13131$ | $1.1613 \times 10^{2}$ |
| $A_{\nu 10}$ | $-1.14111 \times 10^{1}$ | $-1.2983 \times 10^{2}$ |
| $A_{\nu 11}$ | 4.13619 | $-6.01215 \times 10^{2}$ |

| | |
|---|---|
| $\frac{N-1}{N^2}\frac{1}{R_1^3}$ | 0.73027 |
| $\frac{N-1}{N}\frac{D}{R_1}$ | 0.38286 |
| $\frac{R_1}{R_2}$ | $-0.30095$ |
| $\frac{1}{NA}\frac{D}{F}$ | 2.04326 |
| $\frac{D}{R_2}$ | $-0.31550$ |
| $\Delta_{1(10)}$ | 0.00522 |
| $\Delta_{1(9)}$ | 0.00323 |
| $\Delta_{1(7)}$ | 0.00107 |
| $\Delta_{1(5)}$ | 0.00025 |
| $\Delta_{2(10)}$ | 0.00092 |
| $\Delta_{2(9)}$ | 0.00062 |
| $\Delta_{2(7)}$ | 0.00026 |
| $\Delta_{2(5)}$ | 0.00008 |

Embodiment 7

| F | NA | $\beta$ | D |
|---|---|---|---|
| 1 | 0.35 | 0 | 0.71442 |
| N | W.D. | t | Nt |
| 1.57532 | 0.53218 | 0.12857 | 1.50974 |

| | 1st Surface | 2nd Surface |
|---|---|---|
| $R_\nu$ | $6.81830 \times 10^{-1}$ | $-2.27361$ |
| $K_\nu$ | 0 | $-1.74619 \times 10^{1}$ |
| $A_{\nu 2}$ | 0 | 0 |
| $A_{\nu 3}$ | $1.05756 \times 10^{-2}$ | $3.87863 \times 10^{-2}$ |
| $A_{\nu 4}$ | $-2.88742 \times 10^{-1}$ | $-2.71051 \times 10^{-1}$ |
| $A_{\nu 5}$ | $-3.78887 \times 10^{-2}$ | 2.94566 |
| $A_{\nu 6}$ | $8.52064 \times 10^{-1}$ | $-1.04242 \times 10^{1}$ |
| $A_{\nu 7}$ | $-5.4257$ | 1.27926 |
| $A_{\nu 8}$ | 8.39741 | $2.07166 \times 10^{1}$ |
| $A_{\nu 9}$ | $-2.30214$ | $1.11358 \times 10^{2}$ |
| $A_{\nu 10}$ | $-1.05732 \times 10^{1}$ | $-9.48711 \times 10^{1}$ |
| $A_{\nu 11}$ | 4.13659 | $-6.01274 \times 10^{2}$ |

| | |
|---|---|
| $\frac{N-1}{N^2}\frac{1}{R_1^3}$ | 0.73138 |
| $\frac{N-1}{N}\frac{D}{R_1}$ | 0.38267 |
| $\frac{R_1}{R_2}$ | $-0.29989$ |
| $\frac{1}{NA}\frac{D}{F}$ | 2.0412 |
| $\frac{D}{R_2}$ | $-0.31422$ |
| $\Delta_{1(10)}$ | 0.00482 |
| $\Delta_{1(9)}$ | 0.00298 |
| $\Delta_{1(7)}$ | 0.00098 |
| $\Delta_{1(5)}$ | 0.00023 |
| $\Delta_{2(10)}$ | 0.00114 |
| $\Delta_{2(9)}$ | 0.00076 |
| $\Delta_{2(7)}$ | 0.00031 |
| $\Delta_{2(5)}$ | 0.00010 |

Embodiment 8

| F | NA | $\beta$ | D |
|---|---|---|---|
| 1 | 0.35 | 0 | 0.71442 |
| N | W.D. | t | Nt |

-continued

Embodiment 8

| 1.57532 | 0.56564 | 0.08571 | 1.65612 |
|---|---|---|---|
| | 1st Surface | | 2nd Surface |
| $R_\nu$ | $6.81923 \times 10^{-1}$ | | $-2.27212$ |
| $K_\nu$ | 0 | | $-1.79558 \times 10^{1}$ |
| $A_{\nu 2}$ | 0 | | 0 |
| $A_{\nu 3}$ | $1.00181 \times 10^{-2}$ | | $3.89525 \times 10^{-2}$ |
| $A_{\nu 4}$ | $-2.88967 \times 10^{-1}$ | | $-3.04927 \times 10^{-1}$ |
| $A_{\nu 5}$ | $-6.40093 \times 10^{-2}$ | | $2.92927$ |
| $A_{\nu 6}$ | $8.59478 \times 10^{-1}$ | | $-1.04103 \times 10^{1}$ |
| $A_{\nu 7}$ | $-5.46080$ | | $-1.04103 \times 10^{1}$ |
| $A_{\nu 8}$ | $8.43359$ | | $2.20321 \times 10^{1}$ |
| $A_{\nu 9}$ | $-2.13167$ | | $1.18766 \times 10^{2}$ |
| $A_{\nu 10}$ | $-1.09766 \times 10^{1}$ | | $-1.18321 \times 10^{2}$ |
| $A_{\nu 11}$ | $4.13642$ | | $-6.01249 \times 10^{2}$ |
| $\frac{N-1}{N^2} \frac{1}{R_1^3}$ | | 0.73108 | |
| $\frac{N-1}{N} \frac{D}{R_1}$ | | 0.38261 | |
| $\frac{R_1}{R_2}$ | | $-0.30013$ | |
| $\frac{1}{NA} \frac{D}{F}$ | | 2.0412 | |
| $\frac{D}{R_2}$ | | $-0.31443$ | |
| $\Delta_{1(10)}$ | | 0.00500 | |
| $\Delta_{1(9)}$ | | 0.00308 | |
| $\Delta_{1(7)}$ | | 0.00101 | |
| $\Delta_{1(5)}$ | | 0.00024 | |
| $\Delta_{2(10)}$ | | 0.00104 | |
| $\Delta_{2(9)}$ | | 0.00070 | |
| $\Delta_{2(7)}$ | | 0.00029 | |
| $\Delta_{2(5)}$ | | 0.00009 | |

Embodiments 1 to 8 shown above are designed with 7 mm as the focal length F, 0.35 as NA and 0.3 mm as the thickness t of the parallel flat plate which is a transparent protective layer, and have an imaging performance approximate to the limit of diffraction in the range of the angle of view of about 1.2°. Further, the thickness t of the parallel flat plate has a good imaging performance up to a fluctuation of ±0.1 mm under the above-mentioned conditions of NA and the angle of view, that is, has a good imaging performance in a range of t=0.2-0.4 mm. In other words, a good imaging performance is obtained if the thickness t is within a range of $0.02F < t < 0.13F$.

As seen in the above-described Embodiments 1 to 8, in the aspherical single lens of the present invention wherein $t/F \approx 0.3/7$, it is preferable that in addition to the above-mentioned conditions (1) to (3), the following conditions (4) and (5) be satisfied:

$$-0.47 < \frac{D}{R_2} < -0.16 \quad (4)$$

$$1.5 < \frac{D}{F} \frac{1}{NA} < 2.5 \quad (5)$$

The condition (4) is a condition for correcting off-axis aberrations, particularly aspherical aberration, and if the range of this condition is exceeded, it will become impossible to effect the correction of off-axis astigmatism sufficiently while correcting on-axis aberrations and off-axis coma.

Also, the condition (5) is a condition for keeping the shape balance of the lens, and if this condition is exceeded, not only the lens cannot be made compact and light in weight but also the balance of the aperture and the on-axis thickness will be bad, and this is not preferable in making the lens and in adjusting the mounting of the lens. Also, if the lower limit of this condition is exceeded, the correction of all aberrations will become difficult.

In the aspherical single lens according to the present invention, better correction of particularly spherical aberration has been made possible by satisfying the aforementioned conditions (1)-(5) and in addition, satisfying the following conditions (6)-(9):

$$0.004 < \Delta_1(10)/F < 0.006 \quad (6)$$

$$0.0008 < \Delta_1(7)/F < 0.0013 \quad (7)$$

$$0.0008 < \Delta_2(10)/F < 0.0013 \quad (8)$$

$$0.0002 < \Delta_2(7)/F < 0.0004 \quad (9)$$

The conditions (6)-(9) are conditions for determining the aspherical amount in 100% and 70% of the effective diameters of the first and second surfaces of the lens.

If the upper limits of the conditions (6) and (7) are exceeded, spherical aberration will become over, and if conversely, the lower limits of these conditions are exceeded, spherical aberration will become under and the on-axis performance will be deteriorated.

The conditions (8) and (9) are concerned chiefly in the correction of off-axis aberrations, and if the upper and lower limits of these conditions are departed from, coma and astigmatism will occur greatly and the off-axis performance will be deteriorated.

For further correction of spherical aberration, it is preferable that in addition to the aforementioned conditions (1)-(9), conditions $$0.0025 < \Delta_1(9)/F < 0.0035 \quad (10)$$

$$0.00015 < \Delta_1(5)/F < 0.00035 \quad (11)$$

satisfied, and for further correction of off-axis aberrations, it is preferable that in addition to the aforementioned conditions (1)-(9), conditions $$0.00055 < \Delta_2(9)/F < 0.00085 \quad (12)$$

$$0.00006 < \Delta_2(5)/F < 0.00012 \quad (13)$$

be satisfied.

Figure 10:
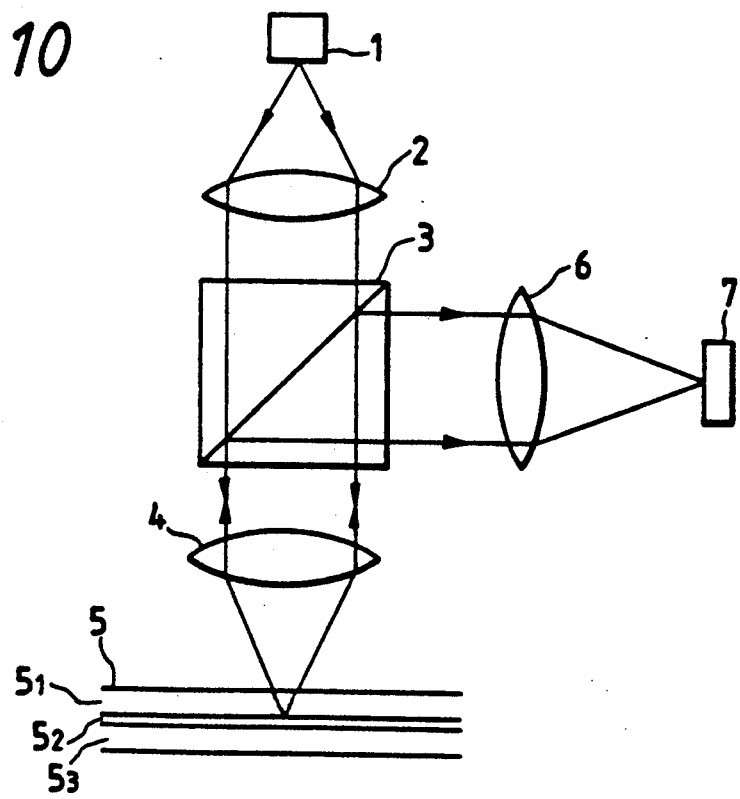
FIG. 10 is a schematic view showing an embodiment in which the aspherical single lens of the present invention is applied to an optical card recording-reproducing apparatus.

FIG. 10 is a schematic view showing an embodiment in which the aspherical single lens of the present invention is applied to an optical card recording-reproducing apparatus. In FIG. 10, the reference numeral 1 designates a semiconductor laser which is a light source, the reference numeral 2 denotes a collimator lens, the reference numeral 3 designates a beam splitter, the reference numeral 4 denotes an objective lens provided by the aspherical single lens of the present invention, the reference numeral 5 designates an optical card, the reference numeral $5_1$ denotes the transparent protective layer of the optical card 5, the reference numeral $5_2$ designates the information recording medium layer of the optical card 5, the reference numeral $5_3$ denotes the back-up substrate of the optical card 5, the reference numeral 6 designates a condensing lens, and the reference numeral 7 denotes a photodetector for detecting auto focusing servo, auto tracking servo and information signals.

A light beam emitted from the semiconductor laser 1 is collimated by the collimator lens 2, is transmitted through the beam splitter 3 and is imaged as a minute spot on the information recording medium layer $5_2$ of the optical card 5 by the objective lens 4. The reflected light from the information recording medium layer $5_2$ of the optical card 5 is again collimated by the objective lens 4. It is then reflected by the beam splitter 3 and passes through the condensing lens 6 to the photodetector 7.

The objective lens 4 is moved in the direction of the optic axis thereof and/or a direction orthogonal to said direction by an actuator, not shown, whereby auto focusing servo and auto tracking servo are effected. By the auto focusing servo and auto tracking servo being effected, a minute spot can be applied to the information recording medium layer, whereby highly accurate recording and/or reproduction of information can be accomplished.

If in the optical head of the above-described optical card recording/reproducing apparatus shown in FIG. 10, the aspherical single lens of the present invention is used as the objective lens 4, the optical head can be made compact and light in weight. Also, the use of the aspherical single lens of the present invention as the collimator lens 2 results in a similar effect.

The details of the present invention have been described with reference to the drawings. According to the present invention, there can be realized an aspherical single lens in which both on axis aberrations and off-axis aberrations have been corrected well.

Particularly, according to the present invention, there can be provided as aspherical single lens in which a transparent parallel flat plate a thickness t of about 0.02F–0.13F is interposed and NA is of the order of NA=0.35 and which has a good imaging performance from on-axis to off-axis up to the angle of view of the order of 1.2°.

By adopting the aspherical single lens of the present invention as the objective lens or as the collimator lens in the optical head of the optical memory device of an optical card recording-reproducing apparatus or the like, the optical head can be made light in weight and compact.

Further, according to the present invention, there can be provided an aspherical single lens in which the movement of the focus by the difference in angle of view is small within the above-mentioned range of the angle of view.

Accordingly, there is provided a collimator lens which is suitably compact and light in weight as a collimator lens and has a good on-axis and off-axis imaging performance and which is particularly preferable for use in a plurality of beam optical systems using an LD array.

What is claimed is:

1. An aspherical single lens whose first and second surfaces each are formed by an aspherical surface and in which, when the distance from an arbitrary point on said aspherical surface to the tangential plane of the vertex of said aspherical surface is x and the distance from said arbitrary point to the optic axis is H and the reference radius of curvature of the $\nu$th surface is $R_\nu$ and the cone constant of the $\nu$th surface is $K_\nu$ and the aspherical coefficient of the $\nu$th surface is $A_{\nu i}$ (i=3, 4, . . . ), said aspherical surface is an aspherical surface represented by the following equation and which satisfies the following conditions (1), (2) and (3):

$$X = \frac{H^2/R_\nu}{1 + \sqrt{1 - (1 + K_\nu)(H/R_\nu)^2}} + A_{\nu 3} H^3$$

$$\ldots + A_{\nu 4} H^4 + \ldots$$

$(\nu = 1, 2)$ $$0.73 < \frac{(N-1) F^3}{N^2 R_1^3} < 0.85 \quad (1)$$

$$0.31 < \frac{(N-1)D}{NR_1} < 0.47 \quad (2)$$

$$-0.36 < \frac{R_1}{R_2} < -0.18 \quad (3)$$

where F is the focal length of said aspherical single lens, D is the on-axis thickness of said aspherical single lens, and N is the refractive index of said aspherical single lens for the wavelength used.

2. An aspherical single lens according to claim 1, further satisfying the following conditions (4) and (5):

$$-0.47 < \frac{D}{R_2} < -0.16 \quad (4)$$

$$1.5 < \frac{D}{F} \frac{1}{NA} < 2.5 \quad (5)$$

3. An optical head comprising:
a light source; and
an optical system for directing a light beam from said light source to an information recording medium;
said optical system comprising an aspherical single lens whose first and second surfaces each are formed by an aspherical surface and in which, when the distance from an arbitrary point on said aspherical surface to the tangential plane of the vertex of said aspherical surface is x and the distance from said arbitrary point to the optic axis is H and the reference radius of curvature of the $\nu$th surface is $R_\nu$ and the cone constant of the $\nu$th surface is $K_\nu$ and the aspherical coefficient of the $\nu$th surface is $A_{\nu i}$ (i=3, 4, . . . ), said aspherical surface is an aspherical surface represented by the following equation and which satisfies the following conditions (1), (2) and (3):

$$X = \frac{H^2/R_\nu}{1 + \sqrt{1 - (1 + K_\nu)(H/R_\nu)^2}} + A_{\nu 3} H^3$$

$$\ldots + A_{\nu 4} H^4 + \ldots$$

$(\nu = 1, 2)$ $$0.73 < \frac{(N-1) F^3}{N^2 R_1^3} < 0.85 \quad (1)$$

$$0.31 < \frac{(N-1)D}{NR_1} < 0.47 \quad (2)$$

$$-0.36 < \frac{R_1}{R_2} < -0.18 \quad (3)$$

where F is the focal length of said aspherical single lens, D is the on-axis thickness of said aspherical single lens, and N is the refractive index of said aspherical single lens for the wavelength used.

4. An optical head according to claim 3, further satisfying the following conditions (6) and (7):

$$-0.47 < -0.16 \quad (6)$$

$$1.5 < D \ 1/F \ NA < 2.5 \quad (7)$$

* * * * *

UNITED STATES PATENT AND TRADEMARK OFFICE
CERTIFICATE OF CORRECTION

PATENT NO. : 5,015,078
DATED : May 14, 1991
INVENTOR(S) : Katsuya Oikawa It is certified that error appears in the above-identified patent and that said Letters Patent is hereby corrected as shown below:

COLUMN 14

Line 65, "-0.47 < -0.16" should read $$-0.47 < \frac{D}{R_2} < -0.16$$

Line 66, "1.5 < D1/FNA < 2.5" should read $$1.5 < \frac{D}{F}\frac{1}{NA} < 2.5$$

Signed and Sealed this

Seventeenth Day of November, 1992

*Attest:*

DOUGLAS B. COMER

*Attesting Officer*     *Acting Commissioner of Patents and Trademarks*